United States Patent
Cribbens et al.

[11] 3,796,838
[45] Mar. 12, 1974

[54] VEHICLE COMMUNICATIONS

[75] Inventors: Alan H. Cribbens; Clive V. Smith, both of Derby, England

[73] Assignee: British Railways Board, London, England

[22] Filed: June 27, 1972

[21] Appl. No.: 266,827

[52] U.S. Cl. .............................. 179/82, 246/63 A
[51] Int. Cl. .................................. H04b 5/00
[58] Field of Search .......... 179/82; 324/47; 178/43; 191/10; 246/63 R, 63 A, 187 R, 122 R, 8; 340/38 R, 38 L, 39

[56] References Cited
UNITED STATES PATENTS

| | | | |
|---|---|---|---|
| 3,492,438 | 1/1970 | Koch | 179/82 |
| 3,105,119 | 9/1963 | Cory | 179/82 |
| 2,403,956 | 7/1946 | Schlesinger | 179/82 |
| 3,526,886 | 9/1970 | Lubich | 246/122 R |

Primary Examiner—Kathleen H. Claffy
Assistant Examiner—Alan Faber
Attorney, Agent, or Firm—George Vande Sande

[57] ABSTRACT

A vehicle communication system for a vehicle moving along a trackway comprises a conductor loop laid in the path of the vehicle, a transmitter arranged to feed a signal into the conductor loop, magnetic and electric field sensing means being provided on the vehicle to pick up the magnetic and electric fields produced by the signal flowing in the loop and wherein a multi-turn coil extending in the path of the vehicle is connected to one end of the loop. Means are provided to suppress the electric field produced by the signal flowing in the coil, and electronic means are carried by the vehicle and arranged to receive the signals from the sensing means and so to determine the relative positioning of the loop and coil with respect to the direction of travel of the vehicle.

4 Claims, 4 Drawing Figures

VEHICLE COMMUNICATIONS

The present invention relates to a vehicle communication system. More particularly it relates to a communication system in which information is passed to a moving vehicle by way of a conductor loop which is laid in the path of the moving vehicle and which is fed with an electrical signal containing the information, this signal being detected by electric and magnetic field pick-ups on the vehicle.

An essential requirement of vehicle communication systems using discrete conductor loops is that of uniquely determining when the end of the loop has been reached. Various methods of generating a unique and recognisable pattern of magnetic field have been suggested, all of which suffer from rather complex conductor configurations, or from the possibility of spurious end-of-section markers being generated.

According to the present invention there is provided a vehicle communication system for a vehicle moving along a trackway, comprising a conductor loop laid in the path of the vehicle, a transmitter arranged to feed a signal into said conductor loop, magnetic and electric field sensing means provided on said vehicle to pick up the magnetic and electric fields produced by the signal flowing in said loop and wherein a multi-turn coil extending in the path of the vehicle is connected to the said loop at one end thereof, means being provided to suppress the electric field produced by the signal flowing in said coil, and electronic means carried by said vehicle and arranged to receive the signals from said sensing means and so to determine the relative positioning of the loop and coil with respect to the direction of travel of the vehicle.

A preferred embodiment of the invention will now be described with reference to the accompanying drawings in which.

Figure 1:
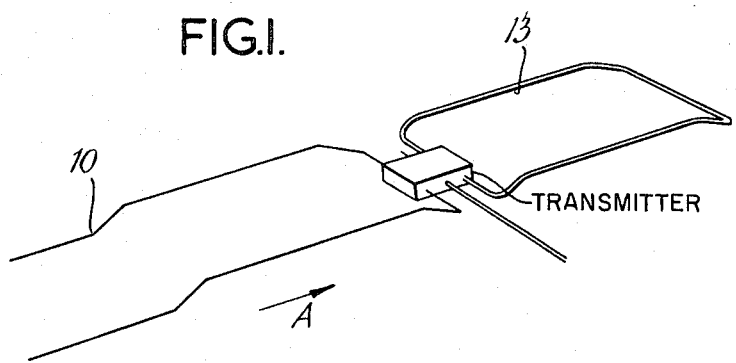
FIG. 1 is a perspective view of the run-off end of a communication conductor loop
Figure 2:
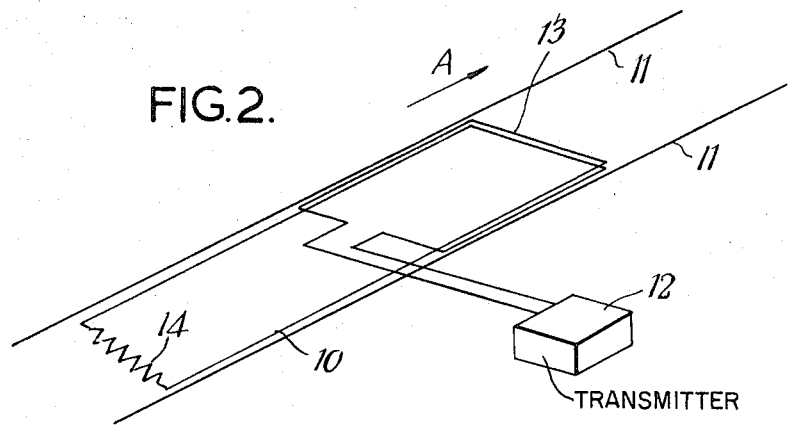
FIG. 2 is a perspective view corresponding to FIG. 1 showing the loop in position between the rails of a railway track.

As shown in FIGS. 1 and 2 a conductor loop 10 is laid between the rails 11 of a railway track, and is fed by a transmitter 12. The loop 10 consists of a pair of cables, spaced according to its location by a distance of between 0.2m and 0.5m, the loop being typically from 200m to 2km long. The current flowing in the loop 10 produces an electric and a magneticfield, the strengths and orientations of which are determined by the magnitude and polarity of the voltage between the conductors of the loop 10 and strength and direction of the current flow respectively. The magnetic field is picked up by a pick-up coil on a train passing along the rails 11, whilst the electric field is picked up by a capacitive probe, for example as described in United States Application Ser. No. 233,192.

In order to indicate to the train when the end of the loop has been reached, a rectangular coil 13 is added in series to the loop 10 at the feed end thereof.

In order to preserve the balance of the transmission line formed by the track conductors, the coil 13 is formed of an equal number of turns of each conductor. In order to ensure that no electric field is produced by the coil 13, it is wound inside a metallic tube. This tube must not form a complete circuit as this would also screen the magnetic field of the coil. For reasons which will be given later, it is necessary to ensure that an electric field signal is received above that part of the track conductor loop immediately adjacent to the coil. In order to meet this requirement in adverse environmental conditions, the track conductors forming the loop 10 are raised a few inches above the sleepers for a short distance. The track conductor loop 10 is always fed from a transmitter 12 at the run-off end and terminated at the run-on end in a load 14 approximately equal in value to the characteristic impedance of the track conductor transmission line, so that the direction of power flow is always opposite to the direction of signalling.

The magnetic field produced by this coil 13 is greater by a suitable margin than any which can arise from the track conductor loop 10 itself, and as such might be considered an acceptable end-of-section marker by itself. However, the chance occurrence elsewhere, through unforseen circumstances, of a magnetic field large enough to be mistaken for an end-of-section marker cannot be ruled out. Hence it is necessary to test the validity of the magnetic field marker by sampling the electric field at the same point. If the large magnetic field is due to a chance displacement of the track conductors forming the loop 10, a large electric field will occompany it, whereas if the large magnetic field is due to the end-of-section coil 13, the electric field will be suppressed to a very small level. Thus, only large magnetic fields which are accompanied by loss of electric field are accepted as valid end-of-section markers. The general form of the electric and magnetic field intensities are indicated in FIG. 3.

Figure 3:
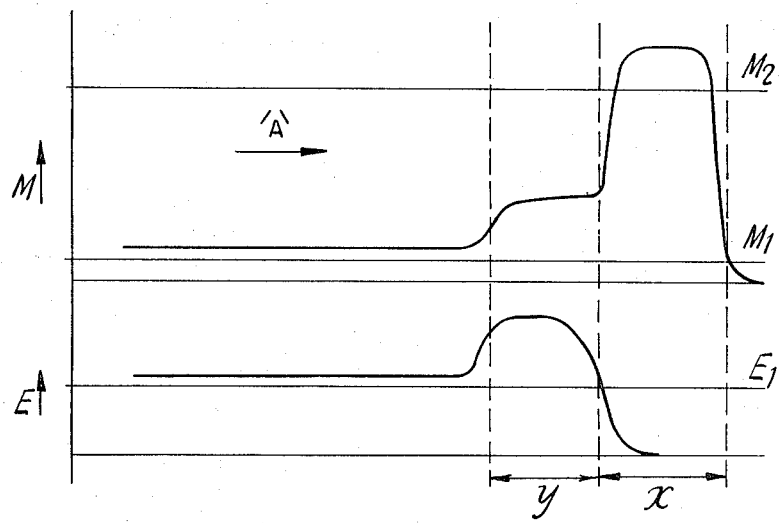
FIG. 3 is a graphical representation of the magnetic and electric field strength at different points along the conductor loop.

FIG. 3 illustrates in the top part the variation of the magnetic field M and in the lower part the variation of the electric field E with distance along the loop 10. In the region of the coil 13, indicated by 'X', the strength of the magnetic field rises steeply whilst that of the electric field falls. It is only when there is this simultaneous rise in the magnetic field and fall in the electric field, as detected by the pick-ups on the train that the train control equipment will sense the information that the end of the conductor loop has been reached.

The rise in the level of the magnetic and electric fields in the region of the raised portion of the loop 10 is indicated at 'y'.

$M_1$, $M_2$, and $E_1$ are the magnetic and electric field signal levels, defined in FIG. 3, above which the threshold detectors register the presence of a signal. The following first sequence of events occurs when the train traverses the coil 13 in the direction A indicated:

1. The magnetic and electric signals are such that $M_1$ and $E_1$ are exceeded; $M_2$ is not.

2. The magnetic signal rises to exceed $M_2$ whilst the electric signal drops to below $E_1$, not necessarily in synchronism and not necessarily in this order.

3. $M_1$ and $M_2$ are exceeded: $E_1$ is not. This condition causes an 'end of section' pulse to be generated.

4. The magnetic signal falls, firstly below M2 and finally below M1.

5. All signals are below threshold.

Condition 1 is essential to the subsequent generation of the end of section pulse.

A train traversing the coil in the opposite direction encounters the following different second sequence of events:

6. All signals are below threshold.

7. The magnetic signal rises, first to exceed M1 and then to exceed M2.

8. M1 and M2 are both exceeded, but E1 is not. No end of section marker is generated.

9. The magnetic signal falls to below M2, but not below M1, while the electric signal rises to exceed E1, not necessarily in this order and not necessarily in synchronism. Here no end of section marker is generated because condition '1' has not occurred before the marker is encountered. The circuitry for generating the 'end of section' pulse on receipt of the correct sequence of threshold signals is shown in FIG. 4.

Figure 4:
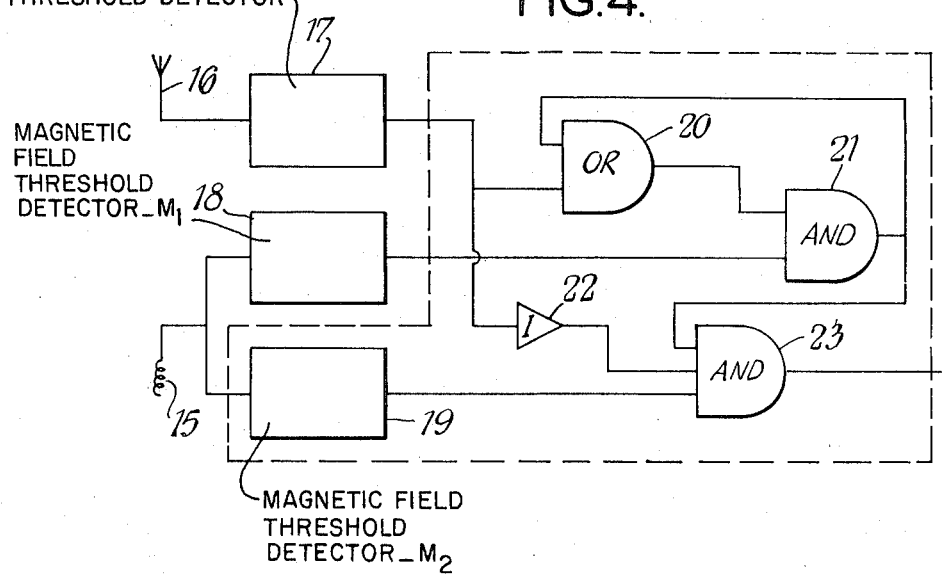
FIG. 4 is a circuit diagram of a logic circuit carried by the vehicle which sense the orientation of the conductor loop and allows or suppresses the generation of an end-of-section output according to the direction of vehicle motion.

The electronic logic circuit shown in FIG. 4 is a simplified version of that used in practice, but its mode of operation is essentially the same. For safety reasons, the electronic logic is arranged in practice to work in a 'dynamic' mode, so that valid outputs consist of signal frequency alternating voltages. Furthermore, in practice two such circuits are used in parallel, their outputs being continuously checked for coincidence.

The magnetic field 'H' is picked up by an inductive coil 15 whereas the electric field 'E' is picked up by a capacitive probe 16 as described.

The probe 16 feeds into a threshold detector circuit 17 which gives a logical '1' output signal whenever the signal detected by the probe 16 exceeds E1. Similarly the coil 15 feeds into two threshold detectors 18 and 19 which give a logical '1' output when the signal detected by the coil 15, exceeds M1 and M2 respectively.

The output from the detector 17 is fed as an input signal on to one input of an OR gate 20. The output from this OR gate 20 is fed as one input to an AND gate 21, the other input to the gate 21 being the output of the threshold detector 18.

The two gates 20 and 21 constitute an electronic latch which is set, giving a logical '1' at the output of gate 21, only when there is a simultaneous output from the detectors 17 and 18 i.e. the electric field exceeds E1 and the magnetic field exceeds M1. Once set, the output of gate 21 remains at logical '1' for as long as there is an output from the detector 18 irrespective of the output from the detector 17. This is because the output of the gate 21 is connected to the other input of the OR gate 20.

The output from the threshold detector 17 is also passed through an invertor circuit 22 whose function is to invert the logical sense of the output from the detector 17. The output of the invertor 22 is fed as one input to a three input AND gate 23. The other inputs to the gate 23 are the output from the gate 21 and from the detector 19. It can therefore be seen that the AND gate 23 will only give an output set to logical '1' if (a) the latch formed by the two gates 20 and 21 is in the set condition, (b) the electric field threshold E1 is not exceeded and, (c) the magnetic field upper threshold M2 is exceeded. Thus a logical '1' output from the gate 23 indicates an 'end of section' whereas a logical '0' output does not. It can be seen that the conditions for the production of an 'end of section' output from the gate 23 corresponds to the previously first listed sequence of events.

We claim:

1. A vehicle communication system for a vehicle moving along a trackway, comprising a conductor loop laid in the path of the vehicle, a transmitter arranged to feed a signal into said conductor loop, magnetic and electric field sensing means provided on said vehicle to pick up the magnetic and electric fields produced by the signal flowing in said loop, a multi-turn coil extending in the path of the vehicle and being connected to the said loop at one end thereof, means being provided to suppress the electric field produced by the signal flowing in said coil, electronic means carried by said vehicle and arranged to receive the signals from said sensing means and so to determine the relative positioning of the loop and coil with respect to the direction of travel of the vehicle.

2. A system as claimed in claim 1 wherein the transmitter is connected to said loop through said multi-turn coil.

3. A system as claimed in claim 1 wherein said electronic means includes first and second magnetic field threshold detectors connected to said magnetic field sensing means, the first threshold detector being arranged to provide an output signal when the magnitude of the magnetic field pick-up by the magnetic field sensing means is above a first level, the second threshold detector being arranged to provide an output signal when the magnitude of the said magnetic field is above a second level of greater magnitude than said first level, the electronic means also including an electric field threshold detector which is arranged to provide an output signal when the magnitude of the electric field pick up by the electric field sensing means is above a predetermined level.

4. A system as claimed in claim 3 wherein said electronic means includes a two input OR gate to one input of which is connected the output of said electric field threshold detector, the output from said OR gate being connected as one input to a two input first AND gate, the other input of said first AND gate being connected to the output of said first magnetic field threshold detector, the output of said first AND being connected to the second input of said OR gate and also one input to a three input second AND gate, the output from said second magnetic field threshold detector being applied as a second input to said second AND gate, the output from said electric field threshold detector being also passed through an invertor circuit and then applied as a third input to said second AND gate, the arrangement being such that the said third AND gate only provides an output signal if the direction of travel of the vehicle is such that the vehicle passes over the loop before passing over the multi-turn coil.

* * * * *

UNITED STATES PATENT OFFICE
CERTIFICATE OF CORRECTION

Patent No. 3,796,838          Dated March 12, 1974

Inventor(s) ALAN H. CRIBBENS and CLIVE V. SMITH

It is certified that error appears in the above-identified patent and that said Letters Patent are hereby corrected as shown below:

Foreign Application Priority Data

June 29, 1971 Great Britain. . . . . .30463/71

Signed and sealed this 16th day of July 1974.

(SEAL)
Attest:

McCOY M. GIBSON, JR.          C. MARSHALL DANN
Attesting Officer             Commissioner of Patents